United States Patent
S Bykampadi et al.

(10) Patent No.: US 12,170,899 B2
(45) Date of Patent: Dec. 17, 2024

(54) SECURE INTER-MOBILE NETWORK COMMUNICATION

(71) Applicant: Nokia Technologies Oy, Espoo (FI)

(72) Inventors: Nagendra S Bykampadi, Bangalore (IN); Bruno Landais, Pleumeur-Bodou (FR)

(73) Assignee: Nokia Technologies Oy, Espoo (FI)

( * ) Notice: Subject to any disclaimer, the term of this patent is extended or adjusted under 35 U.S.C. 154(b) by 467 days.

(21) Appl. No.: 17/252,699

(22) PCT Filed: Oct. 23, 2019

(86) PCT No.: PCT/FI2019/050749
§ 371 (c)(1),
(2) Date: Dec. 15, 2020

(87) PCT Pub. No.: WO2020/094914
PCT Pub. Date: May 14, 2020

(65) Prior Publication Data
US 2021/0120416 A1    Apr. 22, 2021

(30) Foreign Application Priority Data
Nov. 6, 2018  (IN) .............................. 201841041981

(51) Int. Cl.
*H04L 29/06*    (2006.01)
*H04L 9/40*    (2022.01)
(Continued)

(52) U.S. Cl.
CPC ......... *H04W 12/08* (2013.01); *H04L 61/3025* (2013.01); *H04L 63/0281* (2013.01); *H04W 84/042* (2013.01)

(58) Field of Classification Search
CPC . H04W 12/08; H04W 84/042; H04W 12/069; H04L 61/3025; H04L 63/0281;
(Continued)

(56) References Cited

U.S. PATENT DOCUMENTS

| | | | | |
|---|---|---|---|---|
| 7,630,372 B1 * | 12/2009 | Androski | ................ | H04L 61/30 370/352 |
| 2004/0243720 A1 * | 12/2004 | Haumont | .................. | H04L 9/40 709/227 |

(Continued)

OTHER PUBLICATIONS

3rd Generation Partnership Project; Technical Specification Group Services and System Aspects; Security architecture and procedures for 5G system (Release 15), 3GPP TS 33.501, V15.2.0, Sep. 2018, pp. 1-175.

(Continued)

*Primary Examiner* — Ka Shan Choy
(74) *Attorney, Agent, or Firm* — Laine IP Oy (57) ABSTRACT

According to an example aspect of the present invention, there is provided a method, comprising: receiving a first message from a service-consuming second network entity in a second mobile network for a service-providing first network entity in a first mobile network, the first message comprising a first callback resource identifier, generating a second callback resource identifier on the basis of the first callback resource identifier, wherein the second callback resource identifier comprises a domain name of a security edge node in the first network, and transferring a callback message from the first network entity to the security edge node, the callback message comprising the second callback resource identifier.

12 Claims, 4 Drawing Sheets

(51) Int. Cl.
*H04L 61/3015* (2022.01)
*H04W 12/08* (2021.01)
*H04W 84/04* (2009.01)

(58) Field of Classification Search
CPC . H04L 63/08; H04L 65/1069; H04L 65/1095; H04L 67/02
See application file for complete search history.

(56) References Cited

U.S. PATENT DOCUMENTS

| | | | |
|---|---|---|---|
| 2016/0028665 A1* | 1/2016 | Yan | H04W 12/08 |
| | | | 370/329 |
| 2018/0295134 A1 | 10/2018 | Gupta et al. | |
| 2018/0295196 A1 | 10/2018 | Jeong et al. | |
| 2020/0204984 A1* | 6/2020 | Dodd-Noble | H04W 76/12 |
| 2020/0323001 A1* | 10/2020 | Bakker | H04L 65/1069 |
| 2020/0374828 A1* | 11/2020 | Ying | H04W 4/00 |

OTHER PUBLICATIONS

"Reply LS to LS Out on TLS and inter PLMN routing", 3GPP TSG-SA WG3 Meeting #92, S3-182630, SA3, Aug. 20-24, 2018, 2 pages.

"3rd Generation Partnership Project; Technical Specification Group Core Network and Terminals; 5G System; Principles and Guidelines for Services Definition; Stage 3 (Release 15)", 3GPP TS 29.501, V15.1.0, Sep. 2018, 77 pages.

International Search Report and Written Opinion received for corresponding Patent Cooperation Treaty Application No. PCT/FI2019/050749, dated Jan. 15, 2020, 14 pages.

"Telescopic FQDN creation within the SEPP", 3GPP TSG-SA WG3 Meeting #93, S3-183441, Telekom Deutschland GmbH, Nov. 12-16, 2018, 6 pages.

"Telescopic FQDN for callback URIs", 3GPP TSG SA WG3 (Security) Meeting #93, S3-183548, Agenda Item: 7.1.13.1, Nokia, Nov. 12-16, 2018, 2 pages.

"New option to Solution #8 Inter PLMN routing and TLS", 3GPP TSG SA WG3 (Security) Meeting #93, S3-183565, Agenda Item: 8.1, Ericsson, Nov. 12-16, 2018, 4 pages.

Office action received for corresponding Indian Patent Application No. 201841041981, dated Feb. 2, 2023, 10 pages.

* cited by examiner

SECURE INTER-MOBILE NETWORK COMMUNICATION

RELATED APPLICATION

This application claims priority to PCT Application No. PCT/FI2019/050749, filed on Oct. 23, 2019, which claims priority to India Application No. 201841041981, filed on Nov. 6, 2018, each of which is incorporated herein by reference in its entirety.

FIELD

The present invention relates to secure inter-mobile network communications.

BACKGROUND

Network elements or functions located in different Public Land Mobile Networks (PLMNs) may need to communicate for roaming mobile devices. Specific edge security network entities, such as security proxies, may be arranged at the perimeter of a PLMN network to protect the PLMN from outside messages (inbound) and provide additional security services for the inter-PLMN communication between the network elements or functions at the different PLMNs. HTTP(S) may be applied for communication between the network entities in the different PLMNs, as well as between the network functions and the edge security entities. Correct routing of the messages needs to be ensured for various inter-PLMN service scenarios.

SUMMARY

The invention is defined by the features of the independent claims. Some specific embodiments are defined in the dependent claims.

According to a first aspect, there is provided a method, comprising: receiving a first message from a service-consuming second network entity in a second mobile network for a service-providing first network entity in a first mobile network, the first message comprising a first callback resource identifier, generating a second callback resource identifier on the basis of the first callback resource identifier, wherein the second callback resource identifier comprises a domain name of a security edge node in the first network, and transferring a callback message from the first network entity to the security edge node, the callback message comprising the second callback resource identifier.

According to a second aspect, there is provided an apparatus, comprising at least one processor, at least one memory including computer program code, the at least one memory and the computer program code being configured to, with the at least one processor, cause the apparatus at least to: receive a first message from a service-consuming second network entity in a second mobile network for a service-providing first network entity in a first mobile network, the first message comprising a first callback resource identifier, generate a second callback resource identifier on the basis of the first callback resource identifier, wherein the second callback resource identifier comprises a domain name of a security edge node in the first network, and transfer a callback message from the first network entity to the security edge node, the callback message comprising the second callback resource identifier.

According to a third aspect, there is provided a computer program product, a computer readable medium, or a non-transitory computer readable medium comprising program instructions for causing an apparatus to perform the method according to any one of the above aspects or embodiments thereof.

In an embodiment according to any one of the aspects, the first message is a subscription creation message for a notification service and the callback message is a notification message destined to the second network entity.

An embodiment according to any one of the aspects further comprises causing the security edge node to:
fetch the first callback resource identifier in the received first message,
generate the second callback resource identifier,
include the second callback resource identifier in the first message, and
transmit the first message comprising the second callback resource identifier to the first network entity.

An embodiment according to any one of the aspects further comprises causing the security edge node to receive the callback message from the first network entity and replace the second callback resource identifier with the first callback resource identifier before transmitting the callback message to the second mobile network.

An embodiment according to any one of the aspects further comprises causing the first network entity to
fetch the first callback resource identifier in the received first message,
generate the second callback resource identifier, and
include the second callback resource identifier as a uniform resource identifier in the callback message before transmitting the callback message to the security edge node.

In an embodiment according to any one of the aspects, the callback message is an application programming interface (API) callback message.

EMBODIMENTS

Figure 1:
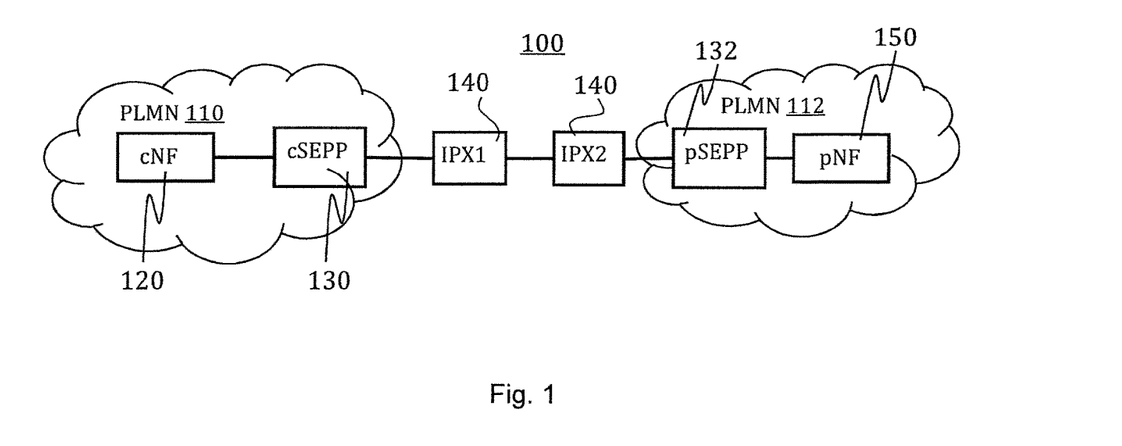
FIG. 1 illustrates an example system capable of supporting at least some embodiments of the present invention.

FIG. 1 illustrates a system 100 of an example embodiment. The system comprises two PLMNs 110, 112 equipped with a Network Function (NF) 120, 150, for example in case of a Third Generation Partnership Project (3GPP) 5G system, an Access and Mobility Function (AMF) or an Authentication Server Function (AUSF). The PLMNs each further comprise a Security Edge Protection Proxy (SEPP) 130, 132 configured to operate as a security edge node or gateway.

The SEPP 130, 132 is a network node at the boundary of an operator's network that receives a message, such as an HTTP request or HTTP response from the NF, applies protection for sending, and forwards the reformatted message through a chain of intermediate nodes, such as IP eXchanges (IPX) 140 towards a receiving SEPP. The receiving SEPP receives a message sent by the sending SEPP and forwards the message towards an NF within its operator's network, e.g. the AUSF. The message can alternatively be sent towards any other network function of the second network. The two SEPPs 130, 132 may also communicate with each other, e.g., regarding their mutual connections.

The SEPP 130, 132 may be configured to act as a non-transparent proxy node. The SEPP may be configured to protect application layer control plane messages between the NFs 120, 150 belonging to the different PLMNs and use the N32 interface to communicate with each other. The SEPP is configured to perform mutual authentication and negotiation of cipher suites with the SEPP in the roaming network. The SEPP is configured to handle key management aspects that involve setting up the required cryptographic keys needed for securing messages on the N32 interface between two SEPPs.

The internetwork interconnect allows secure communication between a service-consuming NF e.g. in a visited PLMN and a service-producing NF e.g. in a home PLMN, henceforth referred to as cNF and pNF, respectively. Security is enabled by the Security Edge Protection Proxies of both networks, henceforth referred to as cSEPP and pSEPP, respectively.

It is to be noted that the SEPPs 130, 132 may simultaneously act in both roles and that their structure may also be similar or identical, while their role in the present examples in delivery of a particular message is identified by use of the prefix "c" or "p" indicating whether they are acting for the service-consuming or service-producing NF.

If there are no IPX entities between the pSEPP 132 and the cSEPP 130, TLS is used between the SEPPs. If there are IPX entities between the pSEPP and the cSEPP, application layer security on the N32 interface between SEPPs is needed for protection between the pSEPP and the cSEPP. An N32-c connection is a TLS based connection that may be established between the pSEPP and the cSEPP. The N32-c connection may be applied between the SEPPs for management of the N32 interface, such as cipher suite and protection policy exchange, and error notifications. An N32-f connection is a logical connection that exists between the pSEPP and the cSEPP for exchange of protected HTTP messages. In some embodiments, the application layer security employs JSON Web Encryption, JWE. Thus, a JSON Object Signing and Encryption (JOSE) header comprises parameters describing the cryptographic operations and parameters applied.

The NFs 120, 150 may be configured to support TLS, both server-side and client-side certificates. The connection between the SEPP 130, 132 and the respective NF 120, 150 may be protected by TLS. Thus, the NFs may be configured to use Hypertext Transfer Protocol Secure (HTTPS) to send HTTP based messages to the remote NF in the other PLMN. HTTPS uses TLS to securely transmit HTTP messages between the NF and the SEPP.

During an NF service discovery in inter-PLMN (roaming) communication, the cNF 120 may request service discovery from a Network Repository Function (NRF) in its PLMN 110. The NRF may send a discovery request to a NRF in another PLMN 112, e.g. the home PLMN. The NRF in the other network 112 may respond with a discovery response which is forwarded to the cNF via the NRF in the PLMN 110 of the cNF. Then the cNF may trigger service requests to the pNF via the cSEPP 130 and the pSEPP 132.

There are situations where the pNF 150 needs to trigger communications with the cNF 120, e.g. to callback a cNF resource. For example, the cNF 120 may subscribe to a notification service produced by the pNF, and the pNF may need to trigger a notification message to the cNF upon meeting a triggering condition. The subscription message may comprise a callback URI, which is used by the pNF to send notifications to the cNF.

The pNF 150 may be configured to apply HTTPS to setup a TLS session with the pSEPP 132 for sending the notification message for the cNF 120. The TLS handshake protocol requires the pNF to authenticate the pSEPP via X.509-certificates. The certificate contains the identity of the pSEPP in the Subject field or alternatively in the SubjectAltName field, which is checked by the pNF against the Request URI used in the HTTPS message. For the TLS handshake to succeed, the domain name in the Request URI included in the HTTPS message needs to match the Subject field or the Subject Alternative Name in the X.509 certificate provided by the pSEPP. The Request URI used by pNF is that of the target cNF in a different PLMN 110, whereas the pSEPP is local in the PLMN 112. This will cause TLS handshake to fail.

There are now provided methods and apparatuses facilitating addressing the problem of arranging communication triggered by service-producing network entity for a service-consuming service entity in another mobile network.

Figure 2:
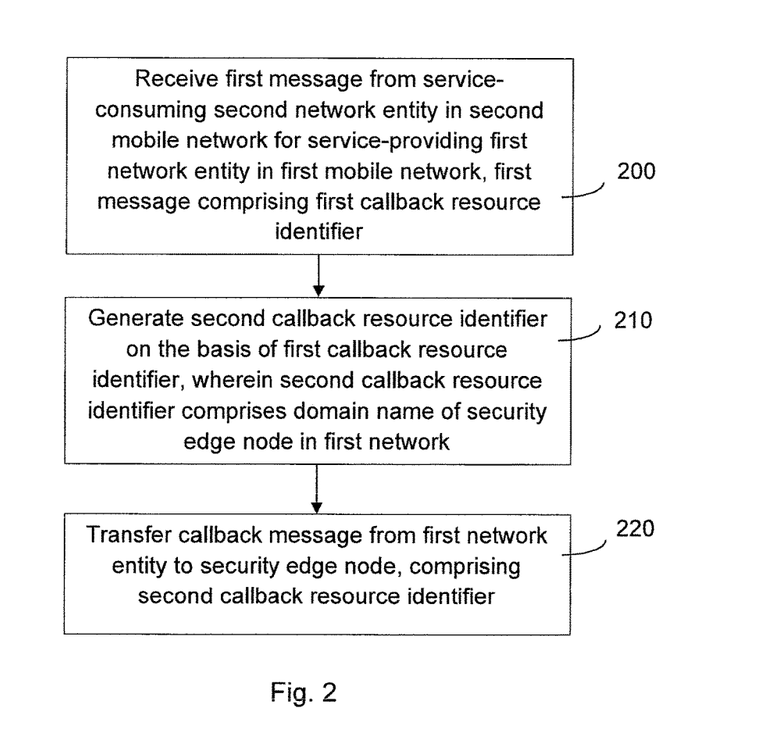
FIGS. 2 to 4 illustrate methods in accordance with at least some embodiments of the present invention.

FIG. 2 illustrates a method according to some embodiments. The method may be implemented in an apparatus receiving a callback resource identifier, such as the pSEPP 132, the pNF 150, or a controller thereof.

The method comprises receiving 200 a first message to a service-providing first network entity in a first mobile network from a service-consuming second network entity in a second mobile network, the first message comprising a first callback resource identifier. A second callback resource identifier is generated 210 on the basis of the first callback resource identifier. The second callback resource identifier comprises a domain name of a security edge node in the first network. The security edge node may be a gateway or proxy device at the border of the mobile network, in some embodiments the pSEPP 132.

A callback message is transferred 220 from the first network entity to the security edge node, the callback message comprising the second callback resource identifier. Block 220 may comprise transmitting or receiving the callback message, depending if the method is applied in the first network entity or the security edge node, respectively.

The term callback resource refers generally to a resource in the second mobile network, identified by the callback resource identifier and to which the first network entity may initiate a connection by the callback message, such as by an API call comprising a callback URI to an API of the service-consuming second network entity. The service-providing first network entity may operate as a server for the service-consuming second network entity acting as a client. In some embodiments, the first callback resource identifier comprises a Fully Qualified Domain Name (FQDN) of the first network entity, and the second callback resource identifier is transformed version of the FQDN, added with the domain name of the security edge node as a top level domain. Such transformed FQDN may also be referred to as a telescopic FQDN.

It is to be appreciated that various modifications and additions may be implemented to the method of FIG. 2 within the scope of the present claims. Some further example embodiments are illustrated below.

Figure 3:
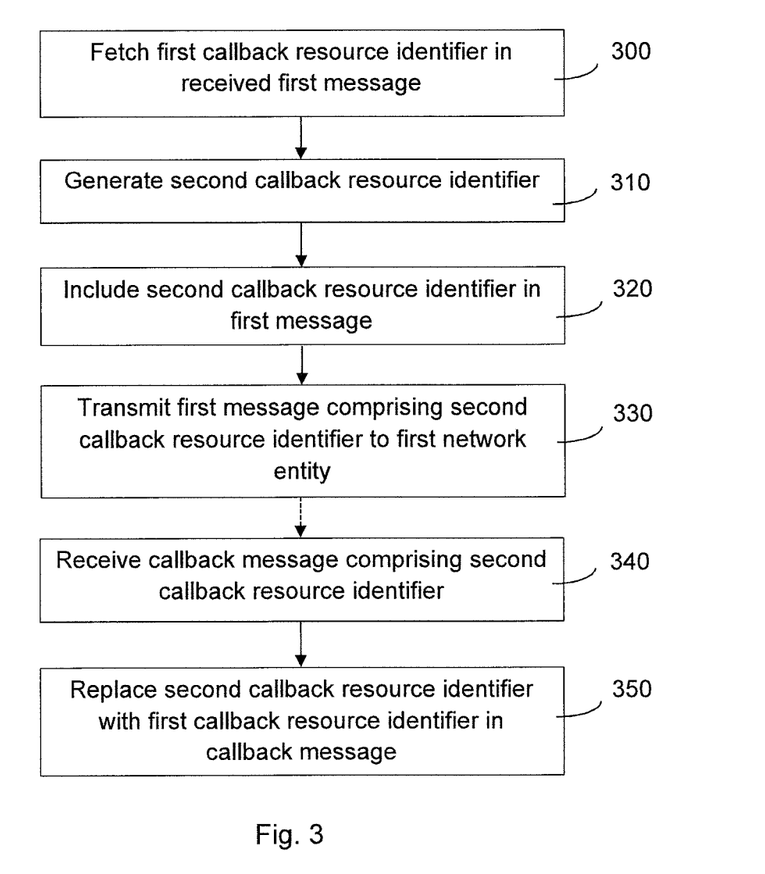

In some embodiments, with reference to FIG. 3, the method is applied by the security edge node, which is configured to:

fetch 300 the first callback resource identifier in the received first message, generate 310 the second callback resource identifier, include 320 the second callback resource identifier in the first message, and transmit 330 the first message comprising the second callback resource identifier to the first network entity.

The security edge node may be configured to receive 340 the callback message from the first network entity and replace 350 the second callback resource identifier with the first callback resource identifier in the callback message before transmitting the callback message to the second mobile network. It is to be appreciated that blocks 340 and 350 may be applied also in the case where the security edge node is not performing the preceding blocks, but the second callback resource identifier is generated by the first network entity.

Figure 4:
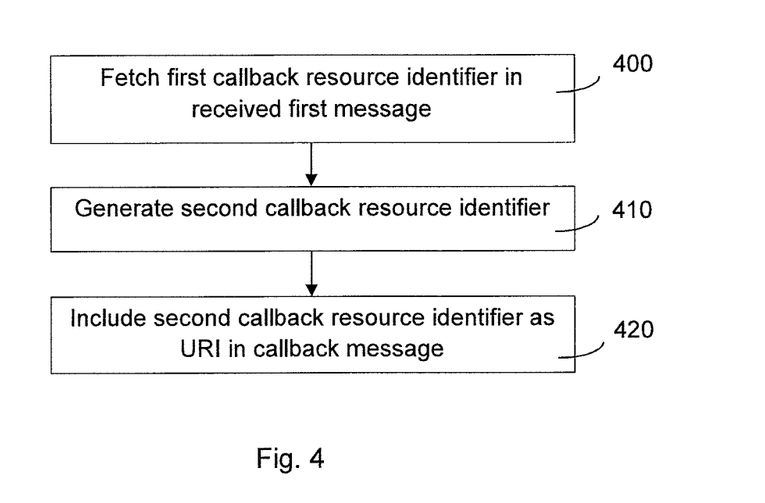

In some embodiments, with reference to FIG. 4, the method is applied by the first network entity, which is configured to:

fetch 400 the first callback resource identifier in the received first message, generate 410 the second callback resource identifier, and include 420 the second callback resource identifier as URI in the callback message before transmitting the callback message to the security edge node.

In some embodiments, the second callback resource identifier is generated 210, 310, 410 in response to detecting a triggering condition for enabling routing of callback messages being met. In other cases, the first message may be forwarded by the security edge node without modification, or the second callback message may be sent without the second callback resource identifier. Such condition may be pre-configured in the security edge node and/or the first network entity. For example, given triggering message type(s) and/or services may be pre-configured, and the triggering condition is met in response to detecting the first message being of the pre-configured type or associated with the pre-configured service.

The second callback identifier may be generated 210, 310, 410 and included 320 in the first message by obtaining the domain name of the security edge node and adding the domain name in the original first callback resource identifier in the first message. Alternatively, a completely new callback identifier is generated on the basis of the first callback identifier and the domain name, and the first callback resource identifier in the first message is replaced with the second callback resource identifier. Similarly, the removal 350 of the second callback resource identifier may refer to replacing the second callback resource identifier with the first callback resource identifier or removal of the domain name of the security edge node in the callback resource identifier field of the callback message.

A TLS session may be established after block 220 or 330 between the first network entity and the security edge node, to transfer the message of block 220 or 330, on the basis of the second callback resource identifier. The TLS session authentication between the first network entity and the security edge node may be carried out on the basis of a wildcard certificate associated with an FQDN of the security edge node. Since also the domain name of the security edge node is included 210 in the second callback resource identifier, the first network entity is able to validate that the identity of the security edge node (in the certificate) matches the domain name included in the second callback resource identifier, thus enabling a successful TLS handshake.

Another TLS session may be established between the security edge node and another security edge node in the second network on the basis of the first callback resource identifier for transmitting the callback message to the second network entity.

In some embodiments, the first network entity is a service-producing network function, such as the pNF 150, the second network entity is a service-consuming network function, such as the cNF 120, and the security edge node is a security edge protection proxy, such as the pSEPP 132. Some further example embodiments are illustrated below with references to the 3GPP 5G system entities. However, it will be appreciated that at least some of the presently disclosed features may be applied for arranging secure communications between mobile networks in other systems, such as 6G or other future generation PLMNs.

The FQDN of the cNF 120 in the callback URI may in block 210, 310, 410 be transformed into a telescopic FQDN by adding the FQDN of the pSEPP 132 (without the asterisk and period) as the new top-level domain. The pSEPP 132 may be configured to apply a wildcard certificate in which the Subject field or the SubjectAltName field comprises a wildcard based domain name, wherein an asterisk and period may be prepended before the domain name.

For example, the callback URI of the cNF 120 may comprise a FQDN, which may contain multiple subdomains:

Hostname.subdomain[s].Domain.TLD

TLD is the top level domain. When the domain name of the pSEPP 132 is appended to the callback URI, a new URI with a telescopic FQDN is obtained, for example:

Hostname.subdomain[s].Domain.TLD.Domain1

Domain1 is domain name of the pSEPP e, also included in the wildcard certificate of the pSEPP. The new authority part of the URI now includes the telescopic FQDN.

When the pNF is configured to apply the embodiment illustrated in FIG. 4, for the pNF to change the original callback URI (from the cNF) to a telescopic FQDN, it needs to know the pSEPP's domain name (or FQDN). The pSEPP's domain name may be (pre-)configured in the pNF and retrieved for block 410. Another option is that the pSEPP informs its domain name for the pNF. The pSEPP may inform the domain when it forwards the message including the callback URI from the cNF, e.g. by inserting it in the message.

In some embodiments, the first message is a subscription (creation or establishment) message for a notification service and the callback message is a notification service message destined to the second network entity. With reference to the 3GPP 5G example embodiments, the cNF 120 need to subscribe to notifications at the pNF 150. This may happen explicitly by means of creating a new subscription resource, or implicitly by updating a relevant resource. When the data-change/event occurs that matches the filter criteria in the subscription, the pNF (taking the role of an HTTP client) uses the provided callback URI to notify the service cNF (taking the role of an HTTP server) about the change. The callback URI in the notification message is modified between the pNF and the pSEPP to include the domain name of the pSEPP as illustrated above.

Figure 5:
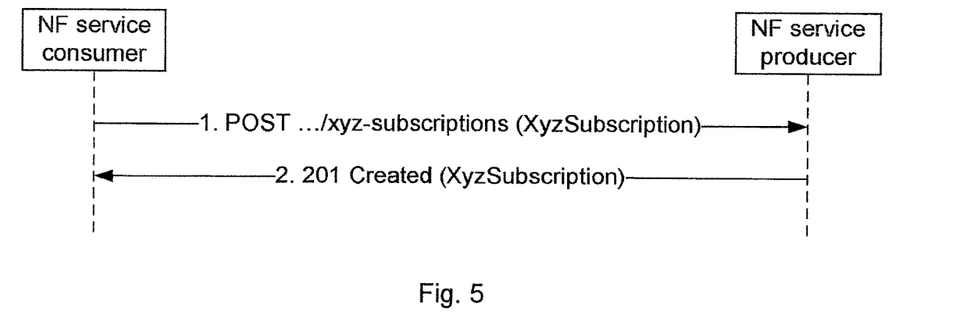
FIGS. 5 and 6 illustrate notification service signalling in accordance with at least some embodiments of the present invention.

With reference to the example of FIG. 5, HTTP POST message (1.) may be applied to create the subscription. The pNF may respond by an HTPP message (2.) confirming the subscription creation.

Figure 6:
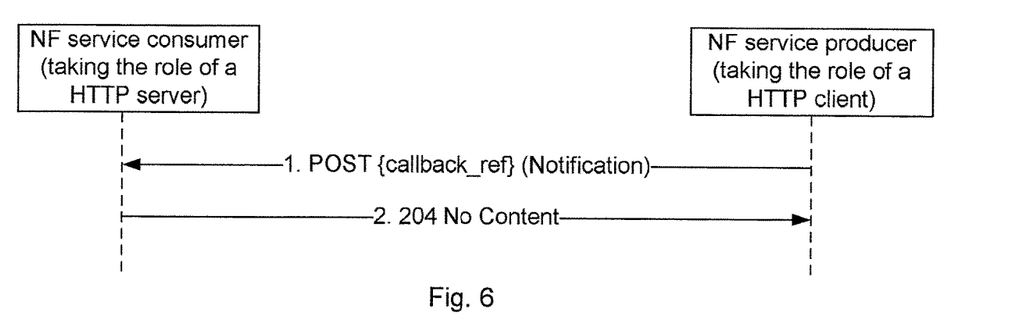

With reference to the example of FIG. 6, HTTP POST message (1.) may be applied for providing the notification from the pNF to the cNF. The callback_ref refers to callback resource identifier applied as the callback/request URI provided during the creation of the subscription resource. The payload body of the POST request comprises the notification payload.

Figure 7:
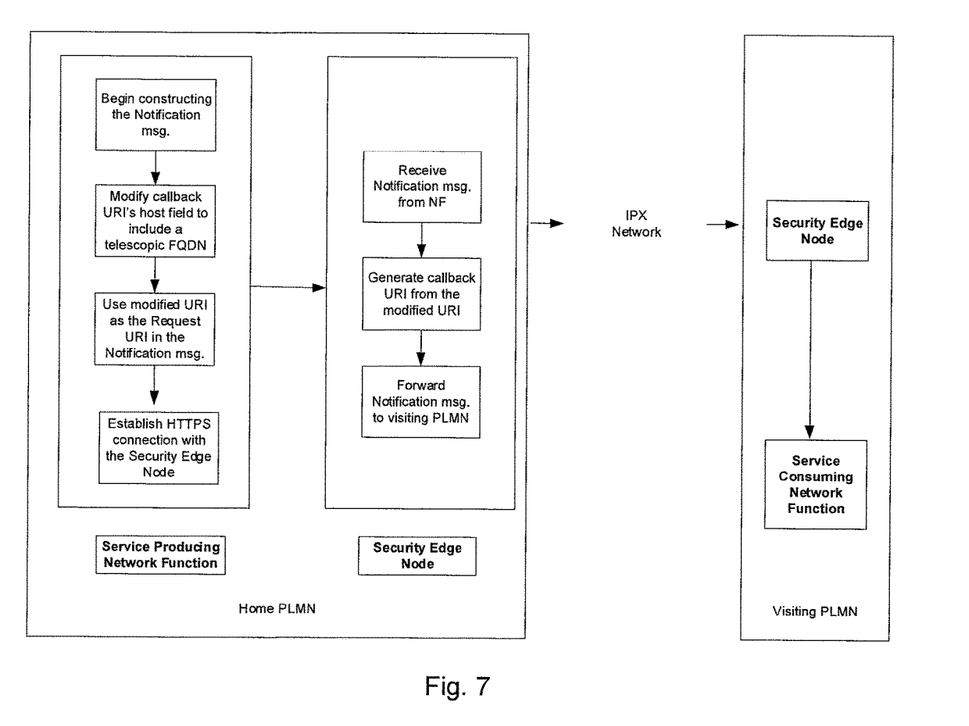
FIG. 7 illustrates actions for inter-PLMN notification message provision in accordance with at least some embodiments of the present invention.

FIG. 7 illustrates actions for providing a notification message from a home PLMN to a visiting PLMN according to some embodiments. The service-producing network function, such as the pNF 150, may be configured to, in response to a need to construct a notification message, modify a callback URI's host field to include the telescopic FQDN, i.e. including also the domain name of the security edge node, such as the pSEPP 132. The modified URI, i.e. the second callback resource identifier, is included in the Request URI field of the notification message and an HTTPS connection is established with the security edge node. After establishment of the HTTPS connection, the security edge node receives the notification message and generates a callback URI (i.e. the first callback URI) on the basis of the modified URI. The security edge node then forwards the notification message including the callback URI to the visiting PLMN and a security edge node (cSEPP) thereof, which further forwards the notification message to a service-consuming network function, such as the c-NF 120.

It is to be appreciated that although examples have been provided for notification service, at least some of the above-illustrated features, such as the methods of FIGS. 2 to 4 may be applied for other services and callback messages triggered by the service-providing first network entity. In some embodiments, at least some of the above-illustrated features are applied for callback messages from a 3GPP Home Session Management Function (H-SMF) to an SMF in VPLMN (V-SMF). For example, at least some of the above-illustrated features may be applied during a H-SMF initiated PDU session modification procedure, wherein the callback URI identifies a PDU session in the V-SMF and is provided by the V-SMF to the H-SMF during the PDU session establishment.

It is to be noted that at least some of the above illustrated features may be applied in systems applying network virtualization. Hence, network functions or nodes illustrated above may be shared between two physically separate devices forming one operational entity. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer. External network virtualization is targeted to optimized network sharing. Another category is internal virtual networking which provides network-like functionality to software containers on a single system. For example, instances of the 5G network functions can be instantiated as virtual network functions (VNFs) in network function virtualization (NFV) architecture.

An electronic device comprising electronic circuitries may be an apparatus for realizing at least some embodiments of the present invention. The apparatus may be or may be comprised in a computer, a server, a proxy device, a network function hosting device, a network access device, network management device or another appropriately configured communications apparatus. In another embodiment, the apparatus carrying out the above-described functionalities is comprised in such a device, e.g. the apparatus may comprise a circuitry, such as a chip, a chipset, a microcontroller, or a combination of such circuitries configured to perform at least some of the above illustrated features.

As used in this application, the term "circuitry" may refer to one or more or all of the following:
  (a) hardware-only circuit implementations (such as implementations in only analog and/or digital circuitry) and
  (b) combinations of hardware circuits and software, such as (as applicable):
    (i) a combination of analog and/or digital hardware circuit(s) with software/firmware and
    (ii) any portions of hardware processor(s) with software (including digital signal processor(s)), software, and memory(ies) that work together to cause an apparatus, such as a mobile phone or server, to perform various functions) and
  (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Figure 8:
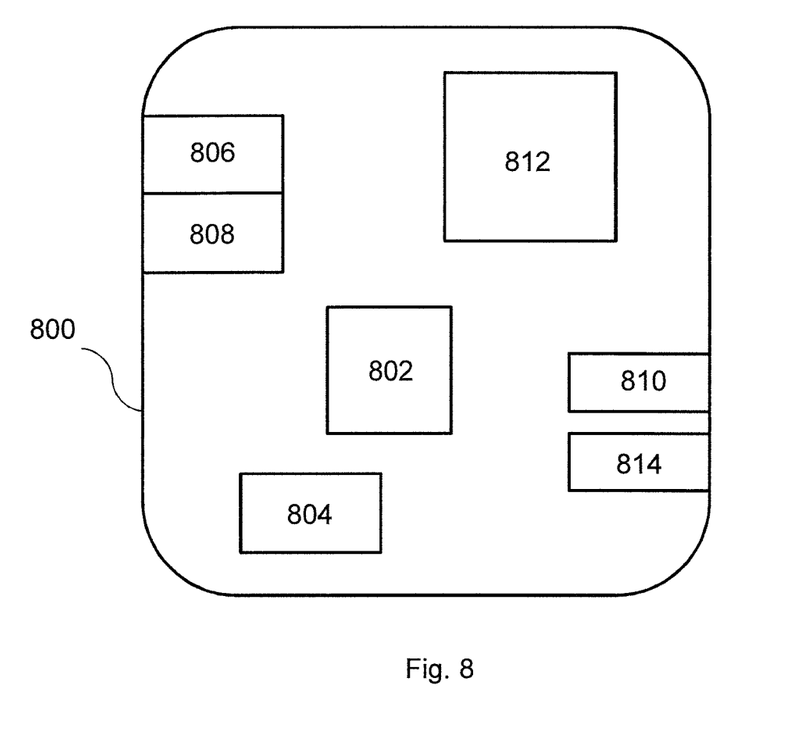
FIG. 8 illustrates an apparatus in accordance with at least some embodiments of the present invention.

FIG. 8 illustrates an example apparatus capable of supporting at least some embodiments of the present invention. Illustrated is a device 800, which may be arranged to carry out at least some of the embodiments related to arranging inter-PLMN communication as illustrated above. The device may include one or more controllers configured to carry out operations in accordance with at least some of the embodiments illustrated above, such as some or more of the steps illustrated above in connection with FIGS. 1 to 7. The device may operate as the first network entity, such as the pNF 150, or the security edge node, such as the pSEPP 132, for example.

Comprised in the device 800 is a processor 802, which may comprise, for example, a single- or multi-core processor wherein a single-core processor comprises one processing core and a multi-core processor comprises more than one processing core. The processor 802 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 800 may comprise memory 804. The memory may comprise random-access memory and/or permanent memory. The memory may comprise at least one RAM chip. The memory may comprise solid-state, magnetic, optical and/or holographic memory, for example. The memory may be at least in part accessible to the processor 802. The memory may be at least in part comprised in the processor 802. The memory 804 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 800 but accessible to the device. For example, control parameters affecting operations related to the credentials management and associated information may be stored in one or more portions of the memory and used to control operation of the apparatus. Further, the memory may comprise device-specific cryptographic information, such as secret and public key of the device 800.

The device 800 may comprise a transmitter 806. The device may comprise a receiver 808. The transmitter and the receiver may be configured to transmit and receive, respectively, information in accordance with at least one wired or wireless, cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, LTE, 5G, wireless local area network, WLAN, and/or Ethernet, for example. The device 800 may comprise a near-field communication, NFC, transceiver 810. The NFC transceiver may support at least one NFC technology, such as NFC, Bluetooth, Wibree or similar technologies.

The device 800 may comprise user interface, UI, 812. The UI may comprise at least one of a display, a keyboard, a touchscreen, a vibrator arranged to signal to a user by causing the device to vibrate, a speaker and a microphone. A user may be able to operate the device via the UI, for example to cause the device to perform at least some functions illustrated above, configure the credentials management service, and/or to manage digital files stored in the memory 804 or on a cloud accessible via the transmitter 806 and the receiver 808, or via the NFC transceiver 810.

The device 800 may comprise or be arranged to accept a user identity module or other type of memory module 814. The user identity module may comprise, for example, a subscriber identity module, SIM, and/or a personal identification IC card installable in the device 800. The user identity module 814 may comprise information identifying a subscription of a user of device 800. The user identity module 814 may comprise cryptographic information usable to verify the identity of a user of device 800 and/or to facilitate encryption and decryption of communication effected via the device 800.

The processor 802 may be furnished with a transmitter arranged to output information from the processor, via electrical leads internal to the device 800, to other devices comprised in the device. Such a transmitter may comprise a serial bus transmitter arranged to, for example, output information via at least one electrical lead to memory 804 for storage therein. Alternatively to a serial bus, the transmitter may comprise a parallel bus transmitter. Likewise the processor may comprise a receiver arranged to receive information in the processor, via electrical leads internal to the device 800, from other devices comprised in the device 800. Such a receiver may comprise a serial bus receiver arranged to, for example, receive information via at least one electrical lead from the receiver 808 for processing in the processor. Alternatively to a serial bus, the receiver may comprise a parallel bus receiver.

The device 800 may comprise further devices not illustrated in FIG. 8. For example, the device may comprise at least one digital camera. Some devices may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 810 and/or the user identity module 814.

The processor 802, the memory 804, the transmitter 806, the receiver 808, the NFC transceiver 810, the UI 812 and/or the user identity module 814 may be interconnected by electrical leads internal to the device 800 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

References throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. The skilled person will appreciate that above-illustrated embodiments may be combined in various ways. Embodiments illustrated in connection with FIGS. 2 to 8 may be taken in isolation or further combined together.

Various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in communications.

The invention claimed is:

1. An apparatus comprising:
   at least one processor;
   at least one memory storing instructions that, when executed by the at least one processor, cause the apparatus at least to:
   receive, in a service-producing first network entity in a first mobile network, a first message from a service-consuming second network entity in a second mobile network, the first message comprising a first callback resource identifier,
   generate, in the service-producing first network entity, a second callback resource identifier on the basis of the first callback resource identifier, wherein the second callback resource identifier includes a domain name of a security edge node in the first network, and
   send a callback message from the service-producing first network entity to the security edge node, the callback message comprising the second callback resource identifier.

2. The apparatus of claim 1, wherein the first callback resource identifier comprises a Fully Qualified Domain Name (FQDN) of the service-producing first network entity, and the second callback resource identifier is a transformed version of the FQDN, with the domain name of the security edge node appended to the FQDN.

3. The apparatus of claim 1, wherein the first message is a subscription creation message for a notification service and the callback message is a notification message destined to the second network entity.

4. The apparatus of claim 1, configured to generate the second callback resource identifier in response to detecting a triggering condition for enabling routing of callback messages.

5. The apparatus of claim 1, configured to establish a transport layer security session between the first network entity and the security edge node on the basis of the second callback resource identifier.

6. The apparatus of claim 5, configured to cause application of a wildcard certificate associated with the domain name of the security edge node for transport layer security session authentication.

7. A method comprising:
   receiving, in a service-producing first network entity in a first mobile network, a first message from a service-consuming second network entity in a second mobile network, the first message comprising a first callback resource identifier,
   generating, in the service-producing first network entity, a second callback resource identifier on the basis of the first callback resource identifier, wherein the second callback resource identifier comprises a domain name of a security edge node in the first network, and
   sending a callback message from the service-producing first network entity to the security edge node, the callback message comprising the second callback resource identifier.

8. The method of claim 7, wherein the first callback resource identifier comprises a Fully Qualified Domain Name (FQDN) of the service-producing first network entity, and the second callback resource identifier is a transformed version of the FQDN, with the domain name of the security edge node appended to the FQDN.

9. The method of claim 7, wherein first message is a subscription message for a notification service and the callback message is a notification message destined to the second network entity.

10. The method of claim 7, wherein the second callback resource identifier is generated in response to detecting a triggering condition for enabling routing of callback messages.

11. The method of claim 7, wherein a transport layer security session is established between the first network entity and the security edge node on the basis of the second callback resource identifier.

12. The method of claim 11, wherein a wildcard certificate associated with the domain name of the security edge node is applied for transport layer security session authentication.

* * * * *